Sept. 22, 1964　　　　J. W. RUSSELL　　　　3,149,688
STAIR-CLIMBING POWER-DRIVEN TRACKED TRUCK
Filed March 22, 1962　　　　　　　　　　2 Sheets-Sheet 1
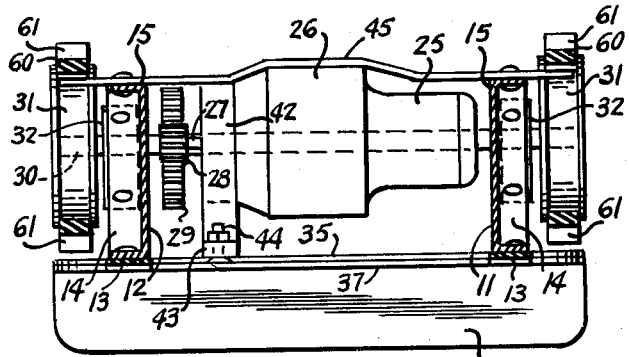
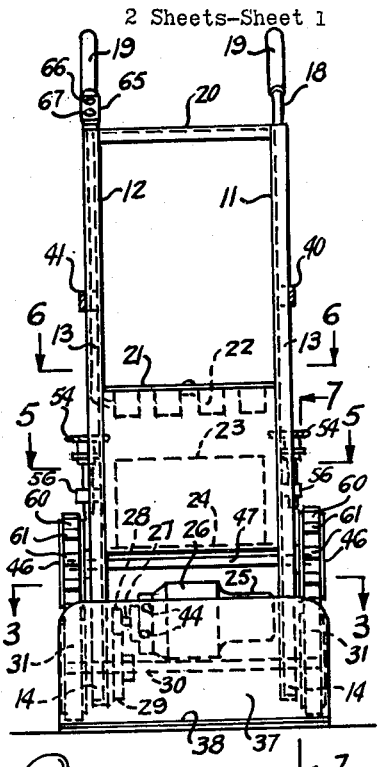
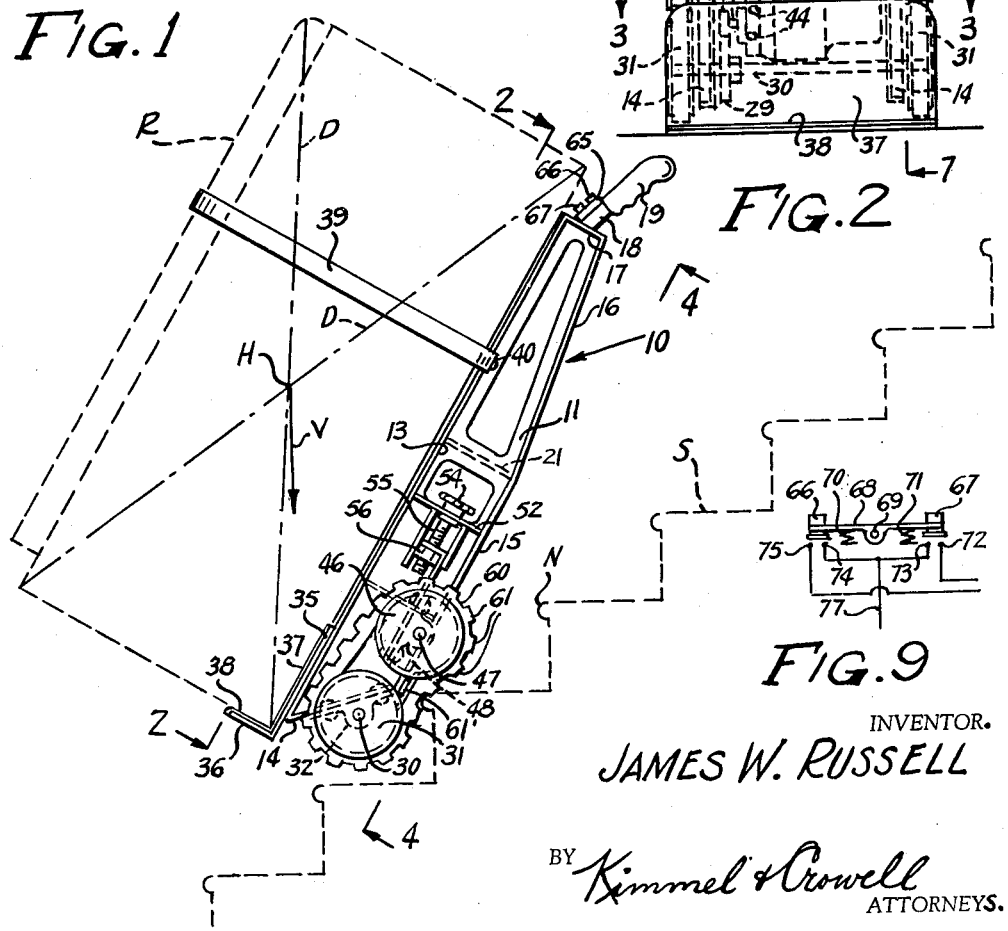
INVENTOR.
JAMES W. RUSSELL
BY Kimmel & Crowell
ATTORNEYS.

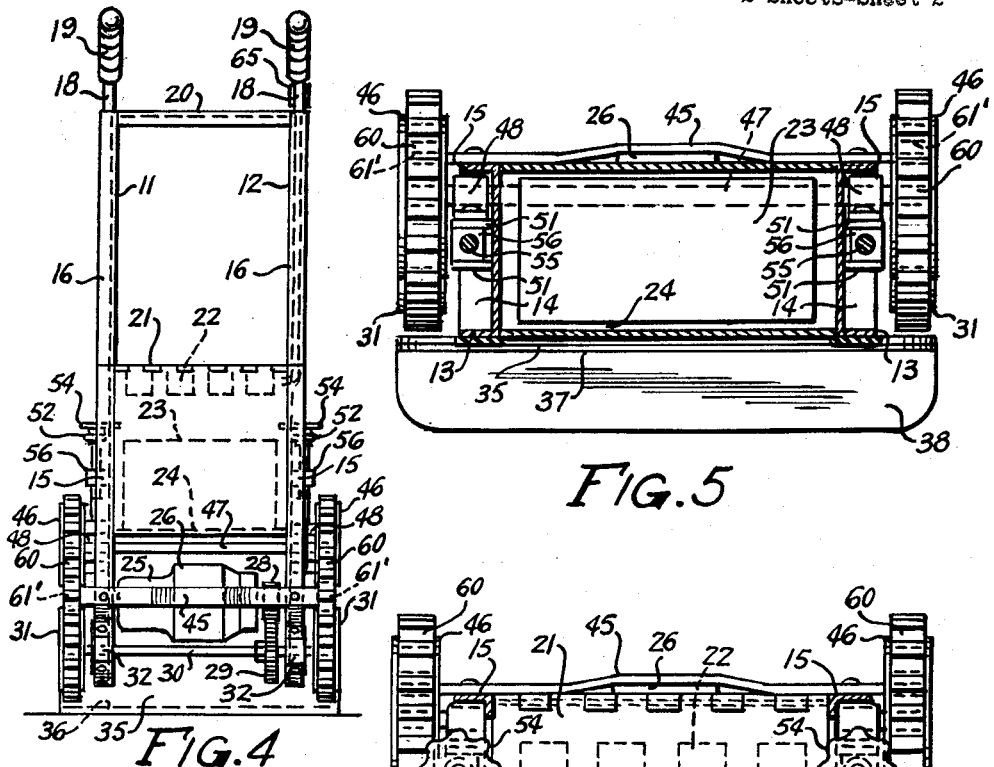
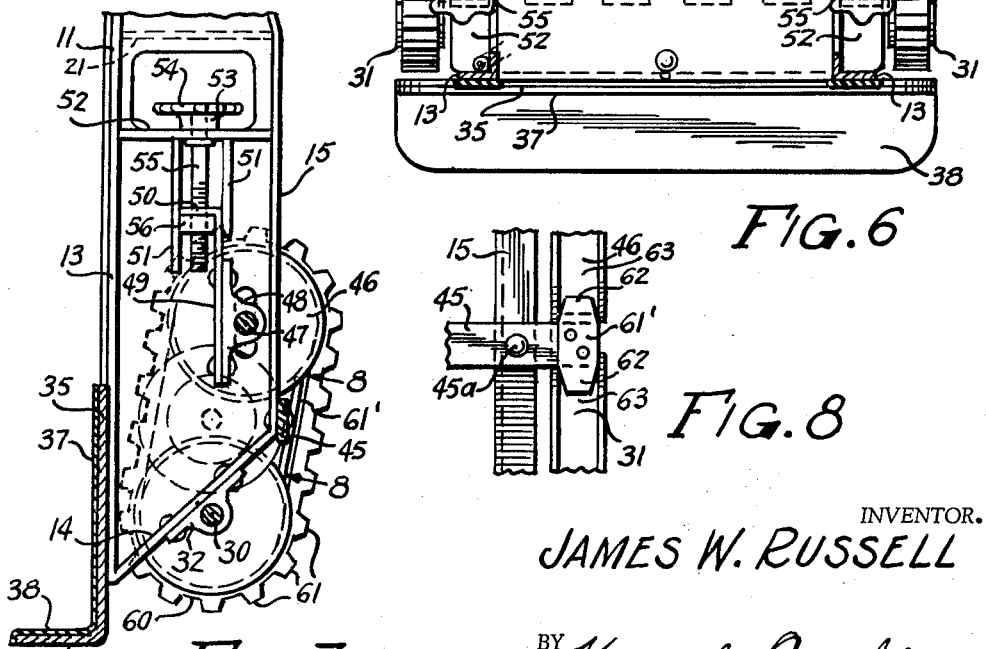

United States Patent Office 3,149,688
Patented Sept. 22, 1964

3,149,688
STAIR-CLIMBING POWER-DRIVEN
TRACKED TRUCK
James W. Russell, Charlotte, N.C., assignor to Stair King, Inc., Mecklenburg, N.C., a corporation of North Carolina
Filed Mar. 22, 1962, Ser. No. 181,550
2 Claims. (Cl. 180—9.22)

This invention relates to a powered truck and more particularly to a self-contained power-driven tracked truck adapted for the moving of furniture, heavy appliances, safes, or other similar weighty, bulky objects with a minimum of effort and difficulty.

An additional important object of the invention is the provision of such a truck which is provided with a single reversible motor, which is readily operable by a single man, thus effecting a material saving in labor costs in the moving, positioning, and installation of appliances such as refrigerators, washing machines, television sets, as well as other articles such as heavy pieces of furniture.

A still further object of the invention is the provision of a device of this character which is adapted to move at a fixed speed approximating the normal walking speed of a man, in such manner that the truck may be handled by a single man at a normal walking speed.

A further very important object of the invention is the provision of a truck of this character which is particularly adapted for the climbing or descending of stairs, and which will, with equal facility, negotiate narrow twisting stairs with irregular risers or treads as well as the conventional stair with equidistantly disposed treads and risers.

A further important object of the invention is the provision of such a truck having its center of gravity adjacent its lower or powered end, and offset relative to the conventional center of gravity of an article transported thereby, so that the same may be effectively balanced by an individual employing the same either on level ground, or in climbing or descending stairs.

Still another object of the invention resides in the provision of an endless track of relatively short length so that the weight of the truck and any article carried thereby is concentrated on a single step, and preferably on the nose thereof at any given time to afford sufficient weight to insure positive traction.

An additional and more specific object of the invention is the provision of a plate positioned between a pair of driving sheaves immediately adjacent the endless track on its lower flight and so arranged and positioned as positively to preclude the weight or pressure of the device and its associated article from forcing the treads inwardly between the spaced driving or driven sheaves to obviate the effect of the treads thereof and affording traction.

An additional specific object of the invention is the provision of a particular type of track, and provided with lugs of sufficient dimension to insure overriding the nose of the step or the like, and yet not of an extent to permit bending or flexing and consequent slippage.

Still another specific object of the invention resides in the provision of an improved means for tensioning the driving belt by displacing the driven sheaves on either side of the device in such manner as to maintain constant and desired tension on the track.

Still another specific object of the invention is the provision of improved fool-proof switch means so constructed that it is impossible for unskilled labor simultaneously to close both circuits to the motor, thus short-circuiting the device, the switch being normally in a neutral position, and immediately returnable to neutral or inoperative position upon release of pressure of one or the other control buttons thereof, and further being so arranged that only one circuit to the motor may be closed at any given time.

Still another specific object of the invention is the provision of such a switch which is immediately accessible to one hand of the operator, so that the other hand may be free to balance the weight of the device.

Still another object of the invention is the provision of a powered truck of this nature which is so designed that the same may be operated in a substantially vertical position from a driving sheave of the track as well as in a substantially horizontal position if desired, although in practice an angular disposition of the vehicle has been found most efficacious, as the balance may be most easily obtained in such position by a simple tilting of the truck.

Still another object of the invention is the provision of a powered truck including a driving axle and associated sheaves and a driven axle and associated sheaves, with the axles being offset relative to the longitudinal axis of the frame of the truck, in order to afford additional stability, balance and traction of the truck and its associated load.

Still other objects reside in the combinations of elements, arrangements of parts, and features of construction, all as will be more fully pointed out hereinafter and disclosed in the accompanying drawings wherein there is shown a preferred embodiment of this inventive concept.

In the drawings:

FIGURE 1 is a side elevational view of one form of powered truck constructed in accordance with the instant invention shown in stair-climbing position, and carrying a load, such as a refrigerator, the stairs and refrigerator both being illustrated in dotted lines;

FIGURE 2 is a front elevational view of the device of FIGURE 1 with its load removed and taken substantially along the line 2—2 of FIGURE 1 as viewed in the direction indicated by the arrows, certain concealed portions of the apparatus being indicated in dotted lines;

FIGURE 3 is an enlarged sectional view taken along the line 3—3 of FIGURE 2 as viewed in the direction indicated by the arrows;

FIGURE 4 is a rear elevational view of the structure of FIGURE 1 taken substantially along the line 4—4 of FIGURE 1 as viewed in the direction indicated by the arrows;

FIGURE 5 is an enlarged sectional view taken along the line 5—5 of FIGURE 2 as viewed in the direction indicated by the arrows;

FIGURE 6 is an enlarged sectional view taken along the line 6—6 of FIGURE 2 as viewed in the direction indicated by the arrows;

FIGURE 7 is an enlarged sectional view taken substantially along the lines 7—7 of FIGURE 2 as viewed in the direction indicated by the arrows;

FIGURE 8 is a fragmentary detailed sectional view taken substantially along the line 8—8 of FIGURE 7 as viewed in the direction indicated by the arrows; and FIGURE 9 is a fragmentary schematic view of the electrical connections of the reversible operating switch for the device.

Similar reference characters refer to similar parts throughout the several views of the drawing.

Having reference to the drawings in detail, the truck of the instant invention is generally indicated 10 and comprises two substantially identical but opposite longitudinally extending frame members 11 and 12. Each frame member is comprised of a substantially level top or upper portion 13, which is preferably formed of relatively rigid angle iron or the like, and an inclined nose portion 14 which merges into a bottom portion 15 which extends substantially half the length of the frame and is then inclined as at 16 toward the rear or handle end thereof, and provided with an end piece 17.

A tubular handle 18 extends from each end portion 17 and is provided preferably with a rubber hand grip 19.

A transverse reinforcing bar 20 extends between the end portion 17 and a plate or sheet 21 extends across an intermediate portion of the truck, and serves as a support for wiring and control mechanism generally indicated at 22 of any desired character which is associated with a battery 23. Battery 23 is supported on a shelf 24 immediately above and adjacent an electric motor 25. The motor 25 serves through a conventional reduction gear box 26 to drive a drive shaft 27 which, through a gear 28, drives a major reduction gear 29 which is keyed or otherwise suitably secured to a driving axle 30. At its outer ends, the axle 30 has fixedly secured thereto a pair of driving sheaves 31. As best shown in FIGURE 7, axle 30 is mounted in bearing lugs 32 carried adjacent the center of the inclined forward pieces 14 of frame members 11 and 12, and is substantially on the longitudinal center line of the frame.

A front support plate 35 extends across the lower end of frame members 11 and 12 and terminates in a right angled step portion 36, both plate portions 35 and 36 being provided with protective coverings 37 and 38 respectively, for the support of an article to be transported by the truck as, for example, a refrigerator R indicated in FIGURE 1. Securing straps 39 are fixed at their opposite ends 40 and 41 to side members 11 and 12, respectively, at an intermediate point, and may be provided with buckles or other fastening means for securement about the refrigerator or other article to be transported.

Motor 25 and its associated reduction gear box 26 are secured to the inner side of plate 35 by means of a metal strap 42 having offset ends 43 which are bolted, as by nuts and bolts 44 to plate 35. An additional supporting brace 45 extends transversely across the frame behind or beneath motor 25 and its associated reduction gear box 26 and is bolted or riveted to frame members 15. The ends of bar 45 extend outwardly beyond the frame members for a purpose which will be more fully pointed out hereinafter.

A pair of driven sheaves 46 are positioned closely adjacent driving sheaves 31, and are carried by an axle 47 which is mounted in a bearing bracket 48, which is bolted in turn to a plate or bar 49 having a right angularly disposed apertured portion 50 which extends between a pair of guides 51. The guides 51 extend from a transverse partition member 52 which extends between upper and lower frame members 13 and 15, partition 52 being apertured to accommodate the hub 53 of a tensioning wheel 54. A bolt 55 secured to hub 53 extends through the aperture in portion 50 and thence through a nut 56, the arrangement being such that rotation of tensioning wheel 54 serves to shift portion 50 and hence its associated plate 49 and axle 47 longitudinally of the frame, for varying the relative spacing of axles 47 and 30 to tension a belt, to more fully be described hereinafter, positioned thereabout.

It is to be understood that a tensioning arrangement is associated with each of frame members 11 and 12, and since such tensioning devices are identical, only one is herein described.

It is to be noted that sheaves 31 and 46 are of the same size, and preferably between seven and eight inches in diameter, and positioned as closely adjacent to each other as possible. This desired diameter is, in order to conform the device to the average stairway, the risers of which are between six and seven inches, so that the entire weight of the truck and its associated piece of furniture or appliance is concentrated in a single spot on the nose N of a step S and either climbing or descending a stairway. A belt 60 engages around each driving sheave and its associated driven sheave, and is provided with a series of cleats 61. The belt may be of any desired material, although it has been found preferable to employ a belt of approximately one and one-half inches in width, and of a material relatively softer than the wood of the average staircase to preclude damage to stairs. The deployment of weight achieved by a wider belt, or a longer belt or both serve to reduce traction of the belt and effect a slipping and spinning motion which frequently cuts grooves in or tears the edges of the stairs. By the appropriate width belt, the points of weight distribution of the machine and its load on the edge of one step with a belt of proper composition and tooth arrangement provides for maximum weight support, balance, and traction, thus giving complete safety to the appliance or load, the machine, the operator, and the stairway.

In the preferred embodiment of the invention, the belt is comprised of wire lacing covered with approximately one-half inch of live rubber with large rubber cleats topped with nylon, molded into an integral unit. The location of the sheaves within approximately an inch of one another permits the negotiation of curved steps, without slippage or loss of traction, and enables the load to be effectively balanced by a relatively slight tipping of the truck by a single operator. In order to be most effective, the cleats are preferably approximately three quarters of an inch in length, and spaced apart approximately one inch in order to accommodate the size of the nose of the normal stairway.

Obviously, other sizes of cleats and belts may be employed for different conditions, the dimensions hereinbefore set forth being applicable to a general purpose apparatus.

In order to preclude any material load upon any unsupported portion of the belt, each end of transverse bar 45 which as previously mentioned, is securely fixed to frame members 15 by means of bolts or rivets 45a extends beyond the frame as indicated at 60 and terminates in a plate 61', the ends of which are tapered as at 62 to conform to the grooves 63 and their adjacent driving and driven sheaves 31 and 46. By virtue of this arrangement, the belt is completely supported at all points during its travel, and loss of traction by the forcing of the belt inwardly between the driving and driven sheaves is completely obviated.

In order effectively to control the direction of drive of motor 25, a control box 65 is positioned on portion 18 of frame member 12, illustratively, this being the right hand side of the frame and includes a forward control button 66 and a reverse control button 67. As best shown schematically in FIGURE 9, buttons 66 and 67 are mounted on an arm 68 which is centrally pivoted as at 69, and which is normally biased to a central or inoperative position by means of springs 70 and 71. Pressure on button 67 will close contacts 72 and 73, 73 being the common ground to energize the motor to drive the apparatus in a forward direction, while pressure on reverse button 66 will establish a circuit between contacts 74 and 75 to reverse the direction of travel of a motor. While contacts 73 and 74 lead to a common ground line 77, it will be seen that it will be impossible to close both circuits simultaneously even by an unskilled operator, and thus avoid a shorting out of the motor.

As best shown in FIGURE 1 diagrammatically, the center of gravity of the refrigerator R is approximately at the intersection I of diagonal lines D. The center of gravity of the truck, however, is located closely adjacent the driving sheaves 31, and in consequence the force vector as indicated by the arrow permits a relatively slight tilting of the truck by means of the operator's grip on the handles 19 to neutralize any shift in center of gravity, and control the movement of the truck and its associated load up and down an incline or flight of stairs, with a minimum of effort and difficulty.

It will thus be readily apparent that a single man employing a truck of the instant invention may very easily transport, at walking speed, a load, in balanced condition, which with the conventional hand truck, would require two, three, or even more men in accordance with the weight of the load.

It is to be noted that the diameters of the driving and driven sheaves, the width of the belt, and the dimensions of the cleats have been defined specifically in conjunction with the apparatus of the instant invention as applied to general usage but that the inventive concept contemplates variations in such dimensions for specific circumstances as may be necessary.

It is also to be understood that the belt 60 may be cleated on its inner surface, and that under certain conditions, when desirable, such a belt may engage sprockets substituted for the sheaves hereinbefore described without departing from the spirit and scope of the invention.

It should also be noted that while the invention is herein described as battery powered, and this has been found preferable for a variety of reasons including weight concentration, range of utility, and simplicity of operation that, if desired, a cord may be provided with a plug for insertion into any suitable electrical outlet. Under these conditions it is desirable to provide a transformer in place of the battery and a self-winding reel for the cable.

From the foregoing, it will now be seen that there is herein provided an improved powered truck which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A powered truck comprising a frame, an upstanding step at one end of the frame and handle means at the other end of the frame, a pair of driving sheaves supported on the frame at the end thereof adjacent the step, said driving sheaves being removed longitudinally from the end a distance less than the radius of the same, a pair of driven sheaves of the same diameter as the driving sheaves positioned adjacent the driving sheaves and at a distance less than the radius thereof longitudinally of the frame, an endless belt fitted around each driving and driven sheave in driving relation therewith, and means for driving the driving sheaves.

2. A device as in claim 1 further including support means adjacent the belt whereby to support the belt when loaded along the run between the sheaves.

References Cited in the file of this patent
UNITED STATES PATENTS

| | | |
|---|---|---|
| 2,440,518 | Lewis et al. | Apr. 28, 1948 |
| 2,592,916 | Leguillon | Apr. 15, 1952 |
| 2,620,041 | Chenette et al. | Dec. 2, 1952 |
| 2,815,988 | Dowell et al. | Dec. 10, 1957 |
| 2,844,413 | Gates et al. | July 22, 1958 |
| 2,856,015 | Stefan | Oct. 14, 1958 |
| 2,917,120 | Gates et al. | Dec. 15, 1959 |
| 2,985,214 | Lugli | May 23, 1961 |
| 2,996,133 | LaWarre et al. | Aug. 15, 1961 |